United States Patent
Yang et al.

(10) Patent No.: US 6,479,126 B1
(45) Date of Patent: Nov. 12, 2002

(54) BOOKBINDING CASE-MAKING APPLICATIONS UTILIZING POLYURETHANES

(75) Inventors: Kang Yang, San Diego, CA (US); David B. Malcolm, Maplewood, MN (US); Michelle B. Acquaye, Woodbury, MN (US); Kevin J. Reid, White Bear Lake, MN (US); John M. Zimmel, St. Paul, MN (US); Merilee M. Reski, Woodbury, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 41 days.

(21) Appl. No.: 09/704,154

(22) Filed: Nov. 1, 2000

Related U.S. Application Data

(60) Division of application No. 08/993,479, filed on Dec. 18, 1997, now Pat. No. 6,207,248, which is a continuation-in-part of application No. 08/667,996, filed on Jun. 19, 1996, now abandoned.

(51) Int. Cl.$^7$ .................................................. B32B 3/06
(52) U.S. Cl. ..................... 428/102; 281/15.1; 281/18; 281/21.1; 281/28; 412/5; 412/8; 412/900; 412/902; 524/293
(58) Field of Search ............................... 428/40.1, 41.3, 428/41.5; 281/21.1, 28, 15.1, 18; 412/5, 8, 900, 902; 524/293

(56) References Cited

U.S. PATENT DOCUMENTS

| | | | | |
|---|---|---|---|---|
| 4,907,822 A | * | 3/1990 | Carter | ........................ 281/15.1 |
| 6,034,159 A | * | 3/2000 | Malcolm | ..................... 524/293 |

* cited by examiner

Primary Examiner—Nasser Ahmad
(74) Attorney, Agent, or Firm—Bin Su

(57) ABSTRACT

Reactive hot melt polyurethane adhesives are useful in the graphic arts area, and in particular, for bookbinding applications such as casemaking, casing-in, gluing-off or thread-securing, facing, slip cases, lining-up, tightbacking, and bonding sides and joints; and for puzzle and gameboard lamination.

19 Claims, 2 Drawing Sheets

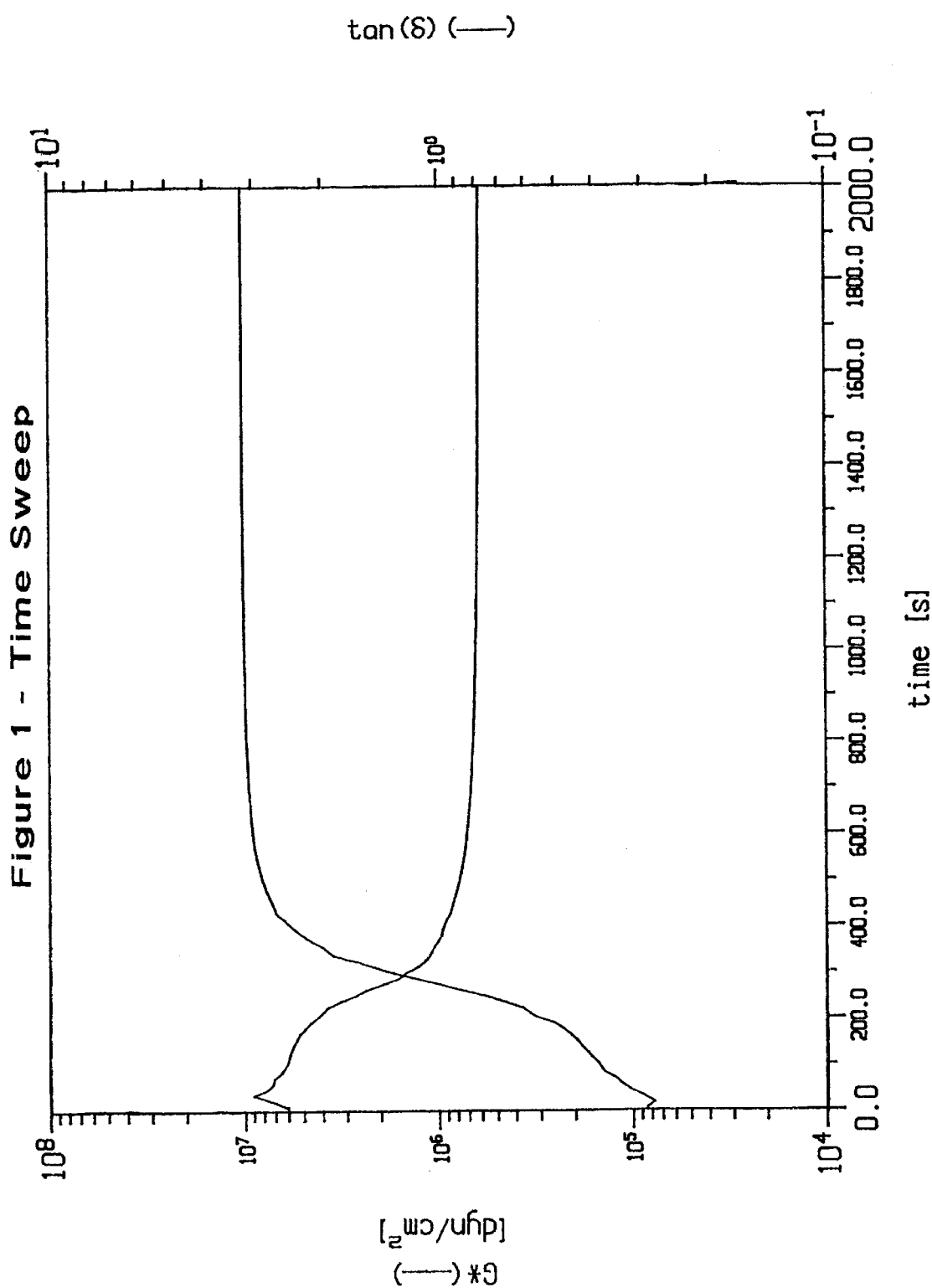

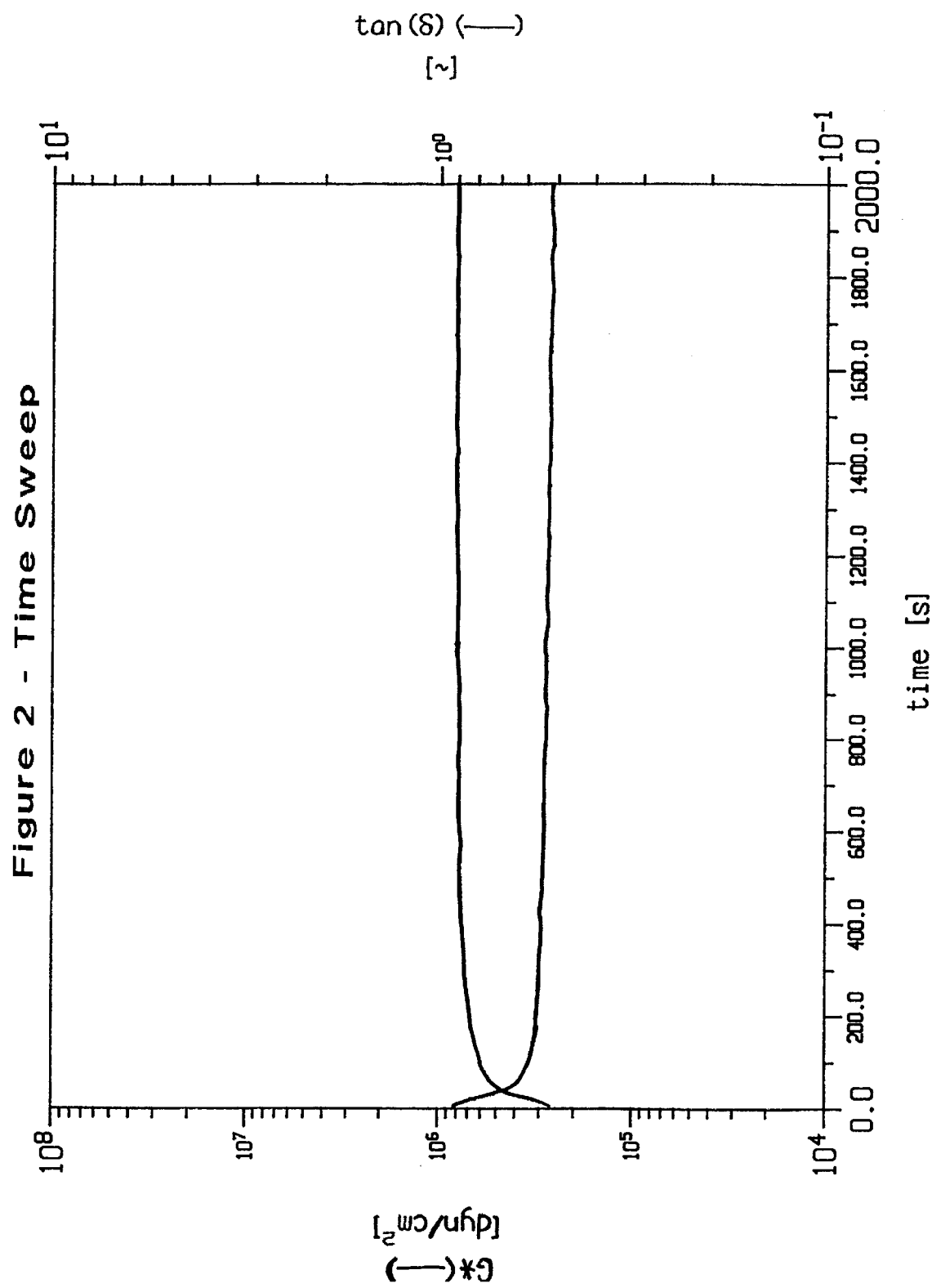

BOOKBINDING CASE-MAKING APPLICATIONS UTILIZING POLYURETHANES

CROSS-REFERENCE TO RELATED APPLICATION

This application is a division of Ser. No. 08/993,479 filed Dec. 18, 1997, now U.S. Pat. No. 6,207,248, which is a Continuation-In-Part of application Ser. No. 08/667,996, filed Jun. 19, 1996, now abandoned, incorporated herein by reference.

FIELD OF THE INVENTION

This invention relates to a method of using a reactive hot melt polyurethane adhesive for graphic art applications, and in particular to a method utilizing a reactive hot melt polyurethane adhesive for bookbinding applications such as casemaking, casing-in, and for gluing-off or thread-securing, facing, slip cases, lining-up, tightbacking, and bonding sides and joints; and for puzzle and gameboard lamination.

BACKGROUND OF THE INVENTION

Adhesives are used for a wide variety of applications in the graphic arts industry such as for bookbinding, and for puzzle and gameboard laminations.

One specific application where adhesives are used is for casemaking. The type of adhesive most often used for this application is referred to as "animal glue," although water based emulsions are also used. Animal glue is an amorphous organic colloid derived from animal protein and extended with various plasticizers including water in amounts of between 40% and 50% by weight. Animal glue is usually applied using a roller which is supplied adhesive from a reservoir heated to between about 60° C. and about 85° C. This roller then transfers it to one or two other rollers which will ultimately come into contact with the covering material. Water based emulsions would be applied in a similar fashion, except the reservoirs would not require heat. "Animal glues" and waterbased emulsions both contain substantial amounts of water. Moisture from the adhesive can migrate into the binding board from the adhesive resulting in warpage of the cover. This migration tendency increases as the amount of water present during the process increases. This has an obviously negative impact on the resultant book.

U.S. Pat. No. 4,944,994 to Flanagan issued Jul. 31, 1990 teaches the use of radial styrene-butadiene block copolymer based hot melt pressure sensitive adhesives, and U.S. Pat. No. 4,722,650 to Allen et al. issued Feb. 2, 1988 teaches the use of A-B-A block or A-B-A-B-A-B multiblock styrene-butadiene copolymer based hot melt pressure sensitive adhesives for use as casemaking adhesives for "hard" bound books. Major problems can occur with adhesives of this type when used in the casemaking application. First, these pressure sensitive hot melts contain oil which can cause staining and "strike-through" of the cover material especially if the cover material has a natural finish which means the material is of a more porous nature. Staining refers to the oil leaching from the hot melt whereas strike-through refers to the adhesive itself penetrating through the material.

The equipment currently used in this industry for casemaking is designed for using "animal glues." The equipment is capable of application temperatures of no greater than about 130° C. Although the hot melt adhesives of the type taught in Flanagan have melting temperatures of about 90° C., the viscosities are too high at this temperature to be used effectively with the application equipment and require temperatures of greater than about 150° C. for effective application. This would therefore require equipment modification which could result in higher cost and is therefore disadvantageous to the book binder.

The second problem occurs during what is called "hot stamping" or embossing of the cover. Hot melt adhesives of this nature have melting points of about 90° C. which are well below "hot stamping" temperatures of typically about 175° C. The temperatures used for hot stamping may be as low as about 120° C., but this is unusual. This can cause the adhesive to vacate the area where the stamping occurs due to the high temperatures used for this process, resulting in voids and causes the cover material to ultimately separate from the binder board.

A third problem occurs due to the lack of heat resistance of these hot melt pressure sensitive adhesives. If a book is exposed to ambient temperatures in the summer, in a car for example, where temperatures can exceed 75° C. the turn-ins may begin to delaminate.

Puzzles and gameboards can be laminated on equipment similar to that used for casemaking and would therefore have similar requirements.

Water based emulsions are also currently used for passport thread-securing and for casing-in. Use of these adhesives for casing-in can have negative consequences for the book due to the substantial amount of water present. Too much moisture leads to saturation of the paper which further results in cockeling or waviness within the first or last twenty pages due to expansion and contraction of the paper as it dries. Moisture travels inward and causes warping of the paper within the book. Migration of moisture into the cover or case can have a similar effect on the cover wherein positive or negative warping occurs which just refers to the direction of the warp either in toward the pages of the book, or outward.

European Pat. Application 0,279,279 published Aug. 24, 1988 teaches the use of styrene-butadiene-styrene block or multiblock copolymer based adhesives containing a tackifying resin, oil, and optionally a wax for use in casing-in operations, and European Pat. Application 0,358,907 published Mar. 21, 1990 teaches the use of a radial styrene-butadiene block copolymer based adhesive containing a tackifying resin and oil for use in casing-in operations. These formulae are hot melt pressure sensitive adhesives and the disadvantage of using such formulae for casing-in is that the oil content leads to staining of the endsheets. Adhesion will also decrease over time as the oil, which makes a major contribution to the level of tack, wicks out of the adhesive, leaving less oil to plasticize the block copolymer and tackifier.

Further disadvantages can result with the handling of hot melt pressure sensitive adhesives like those formulae above. Due to the fact that a pressure sensitive adhesive remains tacky at ambient temperatures, excess adhesive squeezed out beyond the endsheet on to the case during compression will result in the first page of the book adhering to the case of the book, resulting in undesirable fiber tear from the page. Pressure sensitive adhesives also adhere to equipment, clothes, and skin and are difficult to remove.

Other applications where adhesives are used include "lining-up," "tightbacking," and bonding sides or joints. U.S. Pat. No. 4,660,858 to Flanagan et al. issued Apr. 28, 1987 teaches the use of A-B-A block or A-B-A-B-A-B multiblock styrene-butadiene copolymer based hot melt pressure sensitive adhesives and EP Pat. App. No. 0,355,468

A1 teaches the use of radial styrene-butadiene block copolymer based hot melt pressure sensitive adhesives for lining-up applications. U.S. Pat. No. 4,712,808 to Bek-Forrest et al. teaches the use of A-B-A block or A-B-A-B-A-B multiblock styrene-butadiene copolymer based hot melt pressure sensitive adhesives for hinge joint applications. The aforementioned disadvantages of using hot melt pressure sensitive adhesives applies here as well. These inventions do not teach how to make and use a reactive hot melt polyurethane adhesive for lining-up, tightbacking, and bonding sides and joints.

Another application in which water based emulsions are currently used is for passport thread-securing, but these adhesives set very slowly and require drying.

Perfect binding, which is also referred to in the trade as one shot bookbinding, is the most common method by which books are bound. This involves stacking the sheets or signatures of the book, holding them in a clamp to form a book block, applying adhesive to the backbone of the book block, and then adhering a cover to the backbone of the book block before the adhesive is set.

Hot melts are commonly used for perfect binding because the fast rate of set required for this method can be achieved with hot melt adhesives. "Animal glues" and water based adhesives, in contrast, set slowly and are not as commonly used for this application. Although hot melt adhesives based on thermoplastic polymers, such as ethylene vinyl acetate or block copolymers are most commonly used, it has also been taught that reactive hot melt polyurethane adhesives can also be used.

U.S. Pat. No. 4,942,195 to Flanagan et al. issued Jul. 17, 1990 teaches the use of a radial styrene-butadiene block copolymer based hot melt adhesive for use in the binding of books. Binding in this instance appears to encompass one shot or two shot bookbinding. Hot melts are commonly used because of the fast rate of set that can be achieved. Reactive hot melt polyurethane adhesives, in contrast, are not ideally suited for binding because of their slow cure rates.

Articles have been published on the use of hot melt polyurethanes for perfect binding. Two such articles are *Bindery Meets Customer Demands with Polyurethane-Reactive Adhesive.* Adhesives & Sealants Industry and *General Bindery Shifts to PU Reactive Hot Melts,* Adhesives Age, August, 1994. Although the benefits of using reactive hot melt PU adhesives is expounded upon in these articles, the disadvantages are not discussed. Reactive PU hot melts have slow cure rates. Prior to cure the books cannot be stressed. If movement or shifting should occur, the books would no longer be satisfactory for shipment which often occurs before the adhesive is cured. Quality control tests cannot, therefore, in some circumstances be performed prior to shipment, and there is no guarantee that the books will meet specifications. Rounding is a process wherein a curvature is made on the spine of the book block. This occurs after addition of crash and kraft to reinforce the book block, and prior to casing-in of the book wherein a cover is bonded to the book block. It is important that the adhesives remain flexible enough to allow the curvature to be maintained for the prolonged life of the book. These adhesives also allow rounding of the book block for an extended period after adhesive application. European Pat. application 0 361 122 teaches the use of low viscosity reactive polyurethane hot melt adhesives for use in the rounding application.

The above examples illustrate that attempts have been made to replace hot melts with reactive hot melt polyurethanes. However, no attempts or suggestions have been made to replace water based emulsions or animal glues with reactive hot melt polyurethanes.

Although it is known in the art how to make and use reactive hot melt polyurethane adhesives for binding and rounding, it is not known in the art how to make and use reactive hot melt polyurethane adhesives for casemaking, casing-in, gluing-off or thread-securing, lining-up, tightbacking, bonding sides and joints, and laminating puzzles and gameboards because of the disadvantages noted above.

The present inventors have now surprisingly found that reactive hot melt polyurethanes can successfully replace water based emulsions and animal glues. Reactive hot melt polyurethanes cure slowly and are more ideally suited for those applications where slower setting products such as water based emulsions and animal glues are used. Hot melts, in contrast, set more quickly and are generally used for faster applications such as binding and rounding of books, and replacing them with reactive hot melt polyurethanes has not been very commercially successful. One problem which may occur with these polyurethane adhesives is that the bonds do not set quickly enough and are prone to "creep" which simply means that the bond is not set enough prior to cure and the bond line may shift. It is the object of the present invention to teach how to utilize reactive hot melt polyurethane adhesives for these applications. It is a further object of the present invention to teach hot melt moisture curing polyurethane compositions which may be applied at low temperatures and which exhibit a further benefit of forming bonds which are resistant to "creep."

DESCRIPTION OF THE FIGURES

FIG. 1 and FIG. 2 are illustrations of the Dynamic Mechanical Analysis Curve which shows a change in modulus of the hot melt moisture cure polyurethane composition upon ambient cooling from about 120° C. to about 25° C.

FIG. 1 is a curve for Example 4. G*, the complex modulus is the sum of the elastic modulus and the viscous modulus, G" and G'. Tan δ is the ratio of the viscous modulus to the elastic modulus. The properties are monitored in time. The open time goes to zero when Tan δ goes below 1. The open time of Example 4 is about 300 seconds.

FIG. 2 is a curve for Example 5 and shows the same properties as discussed for FIG. 1. Example 5 illustrates a short open time.

SUMMARY OF THE INVENTION

The present invention discloses the use of reactive hot melt polyurethane adhesives in the graphic arts area to replace waterbased emulsions and "animal glues", such as for various bookbinding applications, and for gameboard and puzzle lamination.

Casemaking refers to the method by which a case or cover for a hard bound book is formed. In this process, the material that forms the outer covering of a book is bonded by the use of adhesives to binder boards, which are usually chipboard, to form the actual "hard" covers of books. The material used for the outer covering may include cloth, paper, leather, vinyl, polyethylene and composite materials such as paper or cloth laminated to polyethylene, polyester or "mylar", and polypropylene. Many other materials are also useful for making book covers, and the list is not limited to those materials mentioned here.

The covering material, which is either in precut form or in continuous web form depending on the type of application equipment used, is passed along a conveyor during which time binder boards, which are usually precut, are mated onto the adhesive coated covering material. If the binder boards are precut in two pieces, then a center strip is usually laid down where the backbone of the book is formed. If the binder boards are precut in one large piece, then two cuts will be made where the backbone of the book is formed. If the covering material is not precut, it will be cut at this point so that it extends up to about 1 inch beyond the perimeter of the binder board. The surplus covering material is then folded over onto the binder board in a two step process known as "turning in" in which either the sides are folded in first and the ends are folded in second resulting in an overlap of the ends over the sides, or the ends are folded in first and the sides are folded in second. These are also called "turn-ins." One advantage to using a reactive hot melt PUR for some of these applications is that the same equipment may be utilized for applying reactive hot melt polyurethanes as for "animal glues" with the exception that some cartridge heaters emersed in the hot melt may be required. By using a reactive hot melt PUR, the disadvantages experienced with the high moisture content of the animal glues may be avoided, rates of cure are faster, and adhesion is increased. Replacing waterbased emulsions with reactive hot melt PURs also relieves the bookbinder of the disadvantages experienced with the high moisture content, increases the cure rate, and increases the adhesion to a variety of substrates.

The present invention discloses a case or cover for a hard bound book comprising:

a) an outer covering material; and b) book binder boards;

wherein the binder boards are bonded to the outer covering material with a reactive hot melt polyurethane adhesive which is the reaction product of at least one polyfunctional isocyanate component and at least one polymeric polyol component.

The polyurethane adhesive is generally laminated first to the outer covering material and is applied at an application temperature of about 55° C. to about 135° C.

Casing-in is another application and refers to the process by which the book block is bonded to the inside cover of a "hard" bound book, and therefore occurs after the case making process during which the cover, or case, is made. Casing-in is accomplished by coating the outside of the end sheets of the book block with adhesive, and then laminating the end sheets to the inside of the cover of the book, or by coating the inside of the case or cover and then laminating the end sheets of the book block to it.

The invention further discloses a book comprising:

a) a book block having end sheets; and b) a book cover case;

wherein the end sheets of the book block are bonded to the book cover case with a reactive hot melt polyurethane adhesive which is the reaction product of at least one polyfunctional isocyanate component and at least one polymeric polyol component.

The adhesive is generally applied to the end sheets of the book block at an application temperature of about 55° C. to about 135° C.

Surprisingly, reactive hot melt polyurethanes provide better adhesion to difficult substrates than do water based adhesives or animal glues, providing an added advantage. Another advantage is that the green strength can be controlled by using a higher viscosity adhesive and applying it at a higher temperature. This provides for more flexibility than when using a water based adhesive where the temperature of application and therefore the viscosity and the green strength cannot be varied. Less reactive hot melt polyurethane adhesive will also be required because it cures faster when less is used and the aggressive tack therefore increases with the faster cure.

Books or booklets may be sewn together through the spine in a two thread sewing method, or are side sewn in what is referred to as McCain stitching. "Gluing-off" is the process by which adhesive is either roll coated or extruded onto the spine of the book or booklet immediately prior to application of the case to prevent unraveling of the thread without damaging the book or booklet. This is also referred to as thread-securing. The adhesive must effectively coat both the thread that sits on top of the spine of the book or booklet, and the thread that is pulled through the perforations of the spine and looped around the upper thread. These adhesives must therefore have good flow characteristics. Passports are nine-page booklets which are sewn together in this fashion, and an adhesive is then used to secure the threads in a process that is referred to as passport thread-securing.

The invention further discloses a sewn book or booklet comprising:

a) threads sewn through the spine of the book or booklet;

b) reactive hot melt polyurethane extruded onto the spine; and c) a case bonded to the spine with the reactive hot melt polyurethane adhesive;

wherein the adhesive comprises at least one polyfunctional isocyanate component and at least one polymeric polyol component.

Puzzles and gameboards can be laminated on equipment similar to that used for casemaking and would therefore have similar requirements. Puzzle and gameboard lamination is another application where the adhesives of the present invention may be utilized. Facing or "lining-out" is one of the lamination processes used for making puzzles and gameboards. This is the process by which the playing surfaces are laminated to the chipboard base.

These hot melts can be applied at temperatures of less than about 135° C., preferably less than about 130° C., more preferably less than about 115° C., even more preferably less than about 105° C. and most preferably less than about 100° C. and are particularly well-suited graphic arts applications including the bookbinding applications of casemaking, casing-in, gluing-off or thread-securing, lining-up, tight-backing, and bonding sides and joints; and puzzle and gameboard lamination. The temperature at which the adhesive can be applied is to a great extent controlled by the green strength required for a particular application. The higher the temperature, the higher the green strength. The viscosities of these adhesives are less than about 10,000 cPs at the temperature of application whether it be about 135° C., 130° C., 115° C., 105° C., 100° C. or less.

DETAILED DESCRIPTIONS

The reactive hot melt polyurethane useful herein comprises at least one polyurethane prepolymer. Such polyurethane prepolymers are well known to the industry and are generally formed through the reaction of at least one polyol and an isocyanate resulting in an isocyanate capped polyurethane prepolymer composition. The reaction rate may be increased through the use of a catalyst.

The polyols useful herein are those having an average molecular weight of between about 200 and about 10,000. Their most important feature is that they contain hydroxyl groups or active hydrogen. There are numerous patents and publications teaching the production of polyurethanes such as: U.S. Pat. No. 4,808,255 to Markevka et al. issued Feb. 28, 1989 teaching the use of polyester polyols; U.S. Pat. No. 4,820,368 to Markevka et al. Issued Apr. 11, 1989 teaching the use of polyether polyols; U.S. Pat. No. 4,775,719 to Markevka et al. issued Oct. 4, 1988 teaching the use of polyhydroxy polyols; and U.S. Pat. No. 5,441,808 to Anderson et al. issued Aug. 15, 1995 teaching the use of a polyester polyether copolymers. One of skill in the art would be familiar with the different methods used to manufacture polyurethane prepolymers.

Examples of polyols useful herein are Voranol® 220-110 N and Voranol® 220-056, polyether polyols available from Dow Chemical Co. located in Midland, Mich.; Rucoflex® S-107-55 and Dynacoll® 7210, 7250, 7110, and 7111, amorphous polyester polyols available from RUCO Polymer Corp. located in Hicksville, N.Y. and Hüls America in Piscataway, N.J. respectively; Rucoflex® S-105-36 and Dynacoll® 7340 crystalline polyester polyol available from RUCO Polymer and from Hüls America respectively.

Isocyanate compounds useful herein are typically monomeric small molecules having 2 or more -NCO groups. Isocyanate compounds useful for forming the prepolymer include organic, aliphatic, and aromatic isocyanate compounds having an isocyanate functionality of about 2 or more. The isocyanate compounds can have from 1 to 10 aliphatic or aromatic groups substituted by the isocyanate group. The isocyanate compounds can also contain other substituents which do not substantially adversely affect the viscosity of the isocyanate terminated prepolymers, the adhesive properties of the bond line, or the reactivity of the -NCO groups during the formation of the prepolymer. The isocyanate compound can also comprise mixtures of both aromatic and aliphatic isocyanates and isocyanate compounds having both aliphatic and aromatic character.

Typical aromatic isocyanate compounds include diphenylmethane diisocyanate compounds (MDI) including its isomer, carbodiimide modified MDI, diphenylmethane-4,4'-diisocyanate, diphenyl-methane-2,4'-diisocyanate, oligomeric phenyl methylene isocyanates; toluene diisocyanate compounds (TDI) including isomers thereof, tetramethylxylene diisocyanate (TMXDI), isomers of naphthylene diisocyanate, isomers of triphenylmethane triisocyanate, and mixtures thereof. Aliphatic di, tri, and polyisocyanates are also useful including, for example, isophorone diisocyanate, hydrogenated aromatic diisocyanates, aliphatic polyisocyanate, cycloaliphatic polyisocyanates, and others.

Examples of isocyanate compounds useful herein may include Rubinate7 44 manufactured by ICI Polyurethanes Group located in West Deptford, N.J.

The NCO-terminated polyurethane prepolymer is prepared by reacting a stoichiometric excess of diisocyanate with the polyol components. The reactants are in such proportions that the resulting percent isocyanate is in a range from about 1.0% by weight to about 5.0% by weight, and preferably from about 2.0% by weight to about 4.0% by weight based on 100 parts total prepolymer solids. The prepolymer is processed at temperatures in a range from about 70° C. to about 110° C., and preferably from about 80° C. to about 95° C.

Optionally, catalysts may be utilized to improve curing speed without adversely affecting other physical properties such as green strength or thermal stability. European Pat. Applications 0,492,824,A2 published Jan. 7, 1992, 0,455,400,A2 published Jun. 11, 1991 and 0,668,302,A1 published Aug. 23, 1995 teach the use of 4,4'-(oxydi-2,1-ethanediyl) bis-morpholine for use in catalyzing polyurethane reactions. This catalyst is otherwise known as DMDEE and is available under the tradename of Thancat7 from Texaco Chemical Co. U-Cat 2041, di(2,6-dimethylmorpholinoethyl)ether, is available from Sanapuro Co. and Texacat DMDEE, 2,2'dimorpholinoethyl ether, is available from Texaco Chemical Co. Other catalysts such as ethylene diamine and organo tin and bismuth catalysts such as dibutyl tin dilaurate are not as advantageous.

For more on polyurethane prepolymer synthesis, see *Polyurethane Handbook,* Gunter Oertel, Hanser Publishers, 1985.

Numerous additives can be used to modify such characteristics of polyurethane prepolymers as Tg, viscosity, bonding performance, flexibility, tack, and green strength to name only a few. Such additives may include tackifying resins such as those taught in U.S. Pat. Nos. 4,775,719, 4,820,368, and 4,808,255 to Markevka et al.; thermoplastic polymers such as those taught in U.S. Pat. No. 4,820,368 to Markevka et al.; polyethylene vinyl monomers such as those taught in U.S. Pat. No. 4,775,719 to Markevka et al.; thermoplastic vinyl polymers such as those taught in U.S. Pat. No. 4,808, 255 to Markevka et al.; ethylene vinyl acetate polymers taught in U.S. Pat. No. 4,891,269; ethylenically unsaturated monomers taught in U.S. Pat. No. 5,018,337 issued Apr. 4, 1989; acrylic or methacrylic resins taught in EP 0,246,473 issued Oct. 29, 1988; and aromatic oils as taught in JP 61,115,997 issued Jun. 3, 1986 to mention only some.

In a preferred embodiment of the present invention, a hydrocarbon tackifying resin or an aromatic modified hydrocarbon tackifying resin is utilized to extend the open time of the adhesive while maintaining superior creep resistance. The aromatic content may range from 2% by weight of the resin and up. Examples of useful tackifying resins include the Zonatac® series of aromatic modified hydrocarbon resins including Zonatac® 105 Lite, a styrenated terpene resin having a 105° C. softening point available from Arizona Chemical Co. in Panama City, Fla., the Escorez® 5400 series of hydrocarbon resins and the Escorez® 5600 series of aromatic modified hydrocarbon resins both available from Exxon Chemical Co. in Houston, Tex. These tackifying resins are preferably used from about 20% to about 60% by weight of the adhesive and more preferably from about 30% to about 50% by weight of the adhesive.

Ethylene-vinyl monomer thermoplastic polymers are preferably used in the adhesives of the present invention. In particular, ethylene vinyl acetate copolymers are used in a preferred embodiment in combination with the polyurethane prepolymers of the present invention. These copolymers increase the flexibility and green strength of the adhesive prior to cure of the polyurethane prepolymers. This therefore improves the creep resistance of the bond prior to cure. Preferred ethylene vinyl acetate copolymers are those having a vinyl acetate content of greater than about 25% by weight of the copolymer and preferably greater than about 30% by weight of the copolymer. This may change depending on the type of polyurethane prepolymer which is used. The higher vinyl acetate containing copolymers have been found to be more compatible with the preferred polyurethane prepolymers. Ethylene vinyl acetate copolymers are supplied by DuPont de Nemours in Wilmington, Del. under the tradename of Elvax® and from Millenium Petrochemicals in Rolling Meadows, Ill. under the tradename of Ultrathene®. These polymers are preferably used from about 10% to about 40% by weight of the adhesive and more preferably from about 10% to about 30% by weight of the adhesive.

Ethylene methyl acrylate copolymers, ethylene n-butyl acrylate copolymers and ethylene ethyl acrylate copolymers are also useful to the present invention. Due to the differences in polarity, the amount of copolymer which is preferred may vary when changing from one copolymer to another. This also depends on the type of polyurethane prepolymer which is used. Ethylene methyl acrylate copolymers are available from Exxon Chemical Co. under the tradename of Optema® and from Elf Atochem North America in Philadelphia, Pa. under the tradename of Lotryl®. Ethylene ethyl acrylate copolymers are available from Union Carbide in Danbury, Conn. Ethylene n-butyl acrylate copolymers are available from Elf Atochem under the tradename of Lotryl®, from Exxon Chemical Co. under the tradename of Escorene®, and from Millenium Petrochemicals under the tradename of Enathene®. Terpolymers of ethylene are also available and include ethylene vinyl acetate carbon monoxide polymers available from DuPont de Nemours under the tradename of Elvaloy® as well as ethylene n-butyl acrylate carbon monoxide (ENBACO) polymers also available from DuPont. Other examples of useful polymers include ethylene acrylic acid, ethylene ethyl acrylate copolymers and ethylene vinyl esters.

A wax is optionally used in the compositions of the present invention to lower the viscosity and to increase the rate of set preferably without adversely affecting the long open time. In a preferred embodiment of the present invention, waxes having increased polarity through the use of functional groups are used. The functional groups may be, but are not limited to, hydroxide groups or vinyl monomer groups, i.e., vinyl acetate. This does not exclude the use of ethylene waxes having no functional groups, however. Useful waxes include hydroxy modified waxes, carbon monoxide modified waxes, hydroxy stearamide waxes, fatty amide waxes and various hydrocarbon waxes including high density low molecular weight polyethylene waxes, paraffin waxes and microcrystalline waxes. In a preferred embodiment, AC 830, an ethylene wax modified with a slight amount of carbon monoxide is used. This wax is available from Allied Corporation in Morristown, N.J. Waxes are useful up to about 30% by weight of the composition and preferably from about 10% to about 30% by weight of the composition.

These compositions are characterized as having a viscosity of less than about 10,000 cPs at about 135° C., preferably less than about 10,000 cPs at about 115° C., more preferably less than about 10,000 cPs at about 105° C. and most preferably less than about 10,000 cPs at about 100° C. Most preferably, the adhesives have a viscosity of less than about 10,000 cPs at the temperature of application. These adhesives are preferably applied at temperatures of about 55° C. to about 135° C., more preferably from about 60° C. to about 130° C., even more preferably about 60° C. to about 115° C., even more preferably from about 70° C. to about 110° C., even more preferably from about 80° C. to about 105° C. and most preferably from about 80° C. to about 100° C.

These adhesives are further characterized as having a long open time and a fast rate of set. The open time is measured using Dynamic Mechanical Analysis with a rheometer. The open time refers to the maximum amount of time before a sample will no longer flow at room temperature. In practical terms, it is the maximum amount of time in which a bond may be formed before the adhesive sets. Using a rheometer, the point at which a composition is no longer open enough to form a bond is when Tangent δ is below 1. Tan δ is the ratio of G" to G' or the ratio of viscous character to elastic character. The larger the Tan δ, the less memory or the less solid-like a product is. For some bookbinding applications, it is preferable that the compositions have an open time of greater than about 60 seconds, measured using Dynamic Mechanical Analysis (Test Method No. 2 in this specification) and determined when Tan δ is less than 1, more preferably an open time of greater than about 120 seconds and most preferably an open time of greater than about 180 seconds.

If a composition has a long open time, however, it must also have high cohesive strength to hold the substrates together while the adhesive wets out the surface to form a better bond. The compositions of the present invention also therefore cool to yield a high complex modulus, $G^*=G'+G"$, as measured using Dynamic Mechanical Analysis, when the open time is long. $G^*$ is the ratio of stress to strain and is a measure of the amount of force required to deform the sample and is preferably greater than about $1\times10^4$ dynes/$cm^2$, more preferably greater than about $5\times10^4$ dynes/$cm^2$ and most preferably greater than about $1\times10^5$ dynes/$cm^2$. This characteristic may also be referred to as creep resistance.

The adhesives of the present invention are ideally suited for casemaking, puzzle and game board lamination, casing-in, gluing-off or thread-securing, lining-up, tightbacking, and bonding sides or joints.

Casemaking is accomplished using various types of equipment including, but not limited to, the DA-Chronos casemaker and DA-Strato casemaker manufactured by Kolbus in Rahden, Germany; Model RFC-101 roll fed casemaker manufactured by Crathern Engineering Co. in Contoocook, N.H.; BDM 10, 20, 25, and 30 model casemakers made by Hrauf in Donzdorf, Germany; DM 300 casemaker made by Stahl GmbH & Co. in Ludwigsburg-Neckarweihingen, Germany; and Sheridan roll-fed casemakers. Dexter casemakers and Smyth casemakers are in existence but are no longer manufactured. This equipment typically uses a one or two wheel glue pot application in which one wheel may apply the adhesive or transfer the adhesive to another wheel which then applies the adhesive to the cover material (book outer covering material) and then applies or laminates the binder board to the coated covering material. The outer covering material may be in continuous web form and is then cut after the binder boards are placed on the outer covering material, or it may be precut. The outer covering material is generally laminated to the binder boards by first folding in the sides of the outer covering material and then folding in the ends of the outer covering material resulting in the ends overlapping the sides. As mentioned before, casemaking is most often accomplished with the use of "animal glues" which are applied from a reservoir heated at a temperature from about 60° C. to about 120° C. The equipment is capable of maintaining adhesive temperatures no greater than about 120° C. Rollers are generally used to apply the adhesive. For this application, the adhesives of the present invention are preferably applied at application temperatures from about 60° C. to about 115° C., more preferably from about 80° C. to about 105° C. and most preferably from about 80° C. to about 100° C. The viscosity of the adhesive is preferably less than about 10,000 cPs at the temperature of application. The reactive hot melt polyurethane adhesives of the invention could be applied using this equipment. This is advantageous as compared to using other hot melt systems because they typically require much higher temperatures for application and it would therefore require equipment modification resulting in high costs.

Puzzles and gameboards can be laminated utilizing the same or similar equipment to that of casemaking. Crathern Spotters, made by Crathern Engineering Co., are used for this process. Animal glues are generally used for this application.

Applying reactive hot melt polyurethane adhesives for casing-in may be accomplished in a way similar to that in which water based emulsions are currently applied which is through the use of a roller or series of rollers except that a heated reservoir would be required where water based emulsions are currently used. Typical application equipment for casing-in using water based emulsions are KE and EMP, Compact 2000, and 40, 70 and 100 models from Kolbus which apply adhesives to the endsheets. Lego and Deflores manufacture equipment that applies the adhesive to the cover material first but these are the exceptions to the rule.

The reactive hot melt polyurethane adhesive is applied to the end sheets of the book block and the end sheets are then laminated to the inside of the book cover case. The adhesives may be applied using heated rollers, in bead form using a nozzle extrusion method or by spiral spray or filament applications. For this application, the adhesives are preferably applied at temperatures from about 55° C. to about 135° C., more preferably from about 60° C. to about 115° C., more preferably from about 65° C. to about 105° C. and most preferably from about 65° C. to about 85° C. The viscosity of the adhesives are preferably less than about 10,000 cPs at the temperature of application.

Gluing-off or thread-securing is accomplished using an extrusion system where a heated glue pot is utilized. In this method, the book or booklet is first sewn together through the spine using thread. The reactive hot melt polyurethane adhesive is then extruded onto the spine and a book or booklet case is applied to the spine with the adhesive being between the case and the spine and bonding the two together. The application temperature of the hot melt polyurethane adhesive is from about 55° C. to about 135° C., preferably from about 60° C. to about 115° C., more preferably from about 60° C. to about 105° C. and most preferably from about 65° C. to about 85° C. The viscosity of the adhesive is preferably less than about 10,000 cPs at the temperature of application.

Tightbacking, lining-up and side or joint glue applications are all accomplished using such equipment as the Compact 2000 model from Kolbus; equipment from Stahl; and equipment from Freccia; and Sheridan round backers are used for lining-up. These applications currently use conventional hot melt adhesives such as ethylene vinyl acetate based products or thermoplastic block copolymer based pressure sensitive adhesives. This equipment would therefore not require modification to encompass the use of a reactive hot melt polyurethane.

The low application temperatures and low viscosities allow a book binder to use reactive hot melt polyurethane adhesives where "animal glues" are currently used, without equipment modification. *Crosslinkable Warm-Melts,* Dr. Peter Merz, presented to the Paint Research Association, International Centre for Coatings Technology at the *Advances in Adhesives & Sealants Technology Conference,* discussed the use of warm-melt polyurethanes. Warm-melt polyurethanes are a subclass of the broad class of reactive hot melt polyurethanes but are applied at lower temperatures.

Application equipment can also be specifically developed for the application of reactive warm-melt polyurethane adhesives. Drum or pail unloaders and other closed application systems would protect the adhesive from ambient humidity and would be ideally suited for applying reactive warm-melt polyurethanes.

Application equipment can also be specifically developed for the application of reactive warm-melt polyurethane adhesives. Drum or pail unloaders and other closed application systems would protect the adhesive from ambient humidity and would be ideally suited for applying reactive warm-melt polyurethanes.

The following non-limiting examples further illustrate this invention.

EXAMPLES

1. Molten Brookfield Viscosity

The molten viscosity was determined using a Brookfield Thermosel Viscometer Model DVD I or DVD II. Approximately 10.4 to 10.8 grams of sample are placed in the thermosel and a 27 spindle is used at several different rpms. The values are then averaged.

2. Dynamic Mechanical Analysis

The equipment used was an Rheometrics Dynamic Spectrometer RDS 7700. The sample is placed between parallel plates which are 25 mm in diameter and having a gap of 1 mm. Frequency was 1 radian/second and strain rate was 1.26%. References which may be used include ASTM Test Method D 5279-03 Measuring the Dynamic Mechanical Properties of Plastics in Torsion, ASTM Test Method 4440-93 Rheological Measurement of Polymer Melt using Dynamic Mechanical Properties and Rheometrics Dynamic Spectrometer RDS-7700 Operations Manual.

Example 1

To a clean and dry reactor, add 228 parts of Rucoflex® S-107-55, 342 parts of a pre-melt of Rucoflex® S-105-36 and 228 parts of Voranol® 220-110 N and mix at about 55° C. Add 202 parts of Rubinate® 44 and maintain the reaction between about 80° C. and about 95° C. for about 3 hours. Dissolve about 0.3 parts of Jeffcat® DMDEE into the prepolymer at a temperature of between about 65° C. and about 75° C.

The resultant adhesive is characterized by a viscosity of about 25,000 cPs at about 60° C., about 10,000 cPs at about 75° C., and about 5,000 cPs at about 90° C.

The resultant adhesive was further tested by applying adhesive to the end sheets of a book block by coating the end sheets with the adhesive and mating a cover or case to the end sheets therefore simulating a casing-in operation. The adhesive showed full fiber tearing bonds.

Example 2

To a clean and dry reactor, add 282 parts of Rucoflex® S-105-22, 116 parts of Dynacoll® 7340, 89 parts of Dynacoll® 7111, 103 parts of Dynacoll® 7210, 205 parts of Voranol® 220-110 N, and 30 parts of Nirez® 2019 and mix at about 120° C. for about 30 minutes until a homogeneous polyol mixture is obtained. At a temperature of about 85° C., add 686 parts of Rubinate® 44 and maintain the reaction between about 80° C. and about 95° C. for about 3 hours.

The resultant adhesive was used in a laboratory simulation of casemaking. The adhesive was first applied to a vinyl cover material and the substrate was bonded to a chipboard binder board in a two step turning-in process in which the sides of the cover material are folded in first and the ends folded in last. The adhesive showed 100% fiber tear. This process was then repeated using a glossy paper cover material and Napura7 which is a vinyl type material and the adhesive again showed 100% fiber tear.

Example 3

The adhesive of Example 1 was tested for performance for gluing-off. A nine-page passport booklet was used and adhesive was applied at a temperature of about 99° C. by extruding it onto the threads after the booklet was sewn together through the spine. The adhesive firmly held the threads in place.

Example 4

A polyol was first made by reacting 290 grams of Empol® 1061, a dimer acid available from Emery Division of Henkel Corp. in Cincinnati, Ohio, and 71 grams of neopentyl glycol by charging the reactants in a flash equipped with a mechanical stirrer and a Dean-Stark trap for collecting water from the condensation reaction. The reaction was carried out at 100° C. to 140° C. under a 28 mm Hg vacuum for 4–6 hours until the acid number was below 0.80. The resultant polyol had a hydroxyl number of 55.

The above polyol at 25.9% by weight of the resultant adhesive, was then mixed with 44.0 wt-% Escorez® 5615 hydrocarbon resin from Exxon Chemical Co., 22.0 wt-% Ateva® 2830M wax at about 93° C. to about 107° C. (about 200° F. to about 225° F.) under a 28 mm Hg vacuum for ½ to 1 hour. Isonate® 2125M pure MDI was then added at an amount of about 8 wt-% and the resultant mixture was then mixed under vacuum at about 93° C. to about 135° C. (about 200° F. to about 275° F.) for 1 to 1½ hours.

The resultant adhesive had a viscosity of about 16,500 centipoise (cPs) at a temperature of about 107° C. (about 225° F.) and about 8,700 cPs at about 121° C. (about 250° F.) and an open time of about 300 seconds determined by Dynamic Mechanical Analysise (open time goes to zero when Tan $\delta$ goes below 1). $G^*$, complex modulus, is greater than about $3 \times 10^5$ dynes/cm$^2$. See FIG. 1.

Example 5

The same polyol at an amount of about 27.8 wt-% of the final adhesive was mixed with 14 wt-% of Elvax® 140W, a 33% vinyl acetate 400 melt index ethylene vinyl acetate copolymer available from DuPont, 6 wt-% Elvax 40, a 40% vinyl acetate and 55 melt index ethylene vinyl acetate copolymer available from DuPont, 30 wt-% Zonatac 105 Lite styrenated terpene resin available from Arizona Chemical Co. and 10 wt-% AC 830 wax available from Allied Corp. using the same procedure as Example 4. Isonate® 2125M pure MDI at a wt-% of about 12 was then added using the same procedure as Example 4. The resultant adhesive had a viscosity of about 12,250 cPs at about 93° C. and about 10,550 at about 96° C. (about 205° F.). The thermal stability of the adhesive was measured at about 96° C. for 24 hours and showed a 6.6% increase in viscosity to about 11,250 cPs. The adhesive sets almost immediately (open time goes to zero when Tan $\delta$ goes below 1) as measured by Dynamic Mechanical Analysis as seen in FIG. 2. Tan $\delta$ goes below 1 almost immediately. $G^*$, complex modulus, is about $9 \times 10^4$ dynes/cm$^2$. See FIG. 2.

What is claimed is:

1. A book cover for a hard bound book comprising:
  a) a covering material; and
  b) binder boards;
wherein the binder boards are bonded to the covering material with a reactive polyurethane adhesive, said adhesive comprises the reaction product of at least one polyfunctional isocyanate component and at least one polymeric polyol component.

2. The book cover of claim 1 wherein the application temperature of the reactive polyurethane adhesive is about 80° C. to about 105° C. and the viscosity of the adhesive is less than about 10,000 cPs at about 105° C.

3. The book cover of claim 1 wherein the polyurethane adhesive further comprises additives selected from the group consisting of tackifying resins, thermoplastic polymers, waxes and mixtures thereof.

4. The book cover of claim 3 wherein the adhesive comprises at least one thermoplastic polymer of ethylene copolymerized with a monomer selected from the group consisting of ethyl acrylate, methyl acrylate, n-butyl acrylate, vinyl acetate, vinyl monomers, vinyl esters, carbon dioxide, acrylic acid and mixtures thereof.

5. The book cover of claim 3 wherein the tackifying resin is selected from the group consisting of hydrocarbons and aromatic modified hydrocarbons.

6. The book cover of claim 1 wherein the polyurethane adhesive has an open time greater than about 60 seconds, Tangent $\delta$ of less than about 1 and a complex modulus, $G^*$ of greater than about $1 \times 10^4$ dynes/cm$^2$ as measured using Dynamic Mechanical Analysis on a rheometer.

7. The book cover of claim 1 wherein the polyurethane adhesive comprises from about 20% to about 40% by weight of the adhesive of at least one prepolymer which is the reaction product of at least one polyisocyanate compound and at least one amorphous polyester polyol formed from a diacid and a diol, from about 30% to about 50% by weight of at least one tackifying resin selected from the group consisting of hydrocarbons and aromatic modified hydrocarbons and from about 10% to about 30% by weight of at least one copolymer of ethylene.

8. The book cover of claim 7 wherein the adhesive further comprises from about 10% to about 30% by weight of at least one wax.

9. The book cover of claim 7 wherein the copolymer of ethylene is an ethylene vinyl acetate copolymer having greater than about 28% vinyl acetate by weight of the copolymer.

10. The book cover of claim 1 wherein the covering material is in continuous web form and is cut after the binder boards are bonded onto the covering material.

11. The book cover of claim 1 wherein the covering material is precut.

12. The book cover of claim 1 wherein the covering material is laminated to the binder boards by folding in the sides of the covering material and the ends of the covering material.

13. The cover of claim 1 wherein the reactive polyurethane adhesive is applied to the covering material from a heated reservoir.

14. The book cover of claim 1 wherein the polyurethane adhesive is applied at an application temperature of from about 55° C. to about 135° C. and has a viscosity of less than about 10,000 cPs at the application temperature.

15. The book cover of claim 6, wherein the adhesive has an open time of greater than about 120 seconds.

16. The book of claim 15, wherein the adhesive has an open time of greater than about 180 seconds.

17. The book cover of claim 6, wherein the adhesive has a complex modulus $G^*$ of greater than about $5 \times 10^4$ dynes/cm$^2$.

18. The book cover of claim 17, wherein the adhesive has a complex modulus $G^*$ of greater than about $1 \times 10^4$ dynes/cm$^2$.

19. A hard cover book comprising:
  a) a book cover of claim 1; and
  b) a book block having end sheets bonded on said book block,
wherein said end sheets of the book block are bonded to the book cover with the reactive warm melt polyurethane adhesive.

* * * * *

UNITED STATES PATENT AND TRADEMARK OFFICE
CERTIFICATE OF CORRECTION

PATENT NO. : 6,479,126 B1
DATED : November 12, 2002
INVENTOR(S) : Kang Yang et al.

It is certified that error appears in the above-identified patent and that said Letters Patent is hereby corrected as shown below:

Column 10,
Line 32, "Hrauf" should be -- Horauf --

Column 13,
Line 29, "Dynamic Mechanical Analysise" should be -- Dynamic Mechanical Analysis --

Column 14,
Lines 57-58, "$1 \times 10^4$ dynes/cm$^2$" should be -- $1 \times 10^5$ dynes/cm$^2$ --.

Signed and Sealed this

Fourth Day of March, 2003

JAMES E. ROGAN
*Director of the United States Patent and Trademark Office*